US012333940B2

(12) United States Patent
Mizuno

(10) Patent No.: US 12,333,940 B2
(45) Date of Patent: Jun. 17, 2025

(54) INFORMATION PROCESSING APPARATUS

(71) Applicant: TOYOTA JIDOSHA KABUSHIKI KAISHA, Toyota (JP)

(72) Inventor: Takashi Mizuno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 18/379,691

(22) Filed: Oct. 13, 2023

(65) Prior Publication Data

US 2024/0135816 A1 Apr. 25, 2024
US 2024/0233539 A9 Jul. 11, 2024

(30) Foreign Application Priority Data

Oct. 21, 2022 (JP) ................................ 2022-169453

(51) Int. Cl.
*G08G 1/14* (2006.01)

(52) U.S. Cl.
CPC ............ *G08G 1/146* (2013.01); *G08G 1/143* (2013.01)

(58) Field of Classification Search
CPC ............................. G08G 1/146; G08G 1/143
USPC ..................................................... 340/932.2
See application file for complete search history.

(56) References Cited

U.S. PATENT DOCUMENTS

2013/0176147 A1* 7/2013 Anderson .......... G01C 21/3685 340/932.2
2017/0178511 A1* 6/2017 Berns .................... G08G 1/144

FOREIGN PATENT DOCUMENTS

JP 2003-150992 A 5/2003

* cited by examiner

*Primary Examiner* — Kam Wan Ma
(74) *Attorney, Agent, or Firm* — Dinsmore & Shohl LLP

(57) ABSTRACT

A controller acquires first information related to a request for a predetermined operation performed before a first vehicle moves, which is required for the first vehicle from outside the first vehicle parked in a parking lot; and transmits, in response to acquiring the first information, second information for causing a user of a second vehicle waiting for parking to recognize a position where the first vehicle is parked.

4 Claims, 6 Drawing Sheets

33

LOCK MANAGEMENT TABLE 331

| VEHICLE ID | STATE | UPDATE DATE AND TIME |
|---|---|---|
| ... | ... | ... |

PARKING MANAGEMENT TABLE 332

| VEHICLE ID | PARKING POSITION |
|---|---|
| ... | ... |

PARKING WAITING TABLE 333

| VEHICLE ID | POSITION INFORMATION |
|---|---|
| ... | ... |

HISTORY TABLE 334

| VEHICLE ID | PARKING START | PARKING END | REQUEST DATE AND TIME |
|---|---|---|---|
| ... | ... | ... | ... |

LEARNED MODEL 335

FIG. 4

INFORMATION PROCESSING APPARATUS

CROSS REFERENCE TO THE RELATED APPLICATION

This application claims the benefit of Japanese Patent Application No. 2022-169453, filed on Oct. 21, 2022, which is hereby incorporated by reference herein in its entirety.

BACKGROUND

Technical Field

The present disclosure relates to an information processing apparatus.

Description of the Related Art

A parking lot management device for managing a parking lot has been proposed (see, for example, Patent Document 1).

CITATION LIST

Patent Literature

Patent Literature 1: JP 2003-150992

SUMMARY

An object of the present disclosure is to provide a technique for detecting signs of movement of parked vehicles at an earlier stage and notifying a user waiting for parking.

One aspect of the present disclosure is directed to an information processing apparatus comprising a controller configured to: acquire first information related to a request for a predetermined operation performed before a first vehicle moves, which is required for the first vehicle from outside the first vehicle parked in a parking lot; and transmit, in response to acquiring the first information, second information for causing a user of a second vehicle waiting for parking to recognize a position where the first vehicle is parked.

Another aspect of the present disclosure is a system including the information processing apparatus, a method executed by the information processing apparatus, a program for causing the method to be executed by a computer, and a storage medium storing the program in a non-transitory manner.

According to the present disclosure, a technique can be provided for detecting signs of movement of parked vehicles at an earlier stage and notifying a user waiting to park.

BRIEF DESCRIPTION OF THE DRAWINGS

FIG. 4 is a diagram illustrating an example of data stored in the auxiliary storage unit of the server.

DESCRIPTION OF THE EMBODIMENTS

Figure 1:
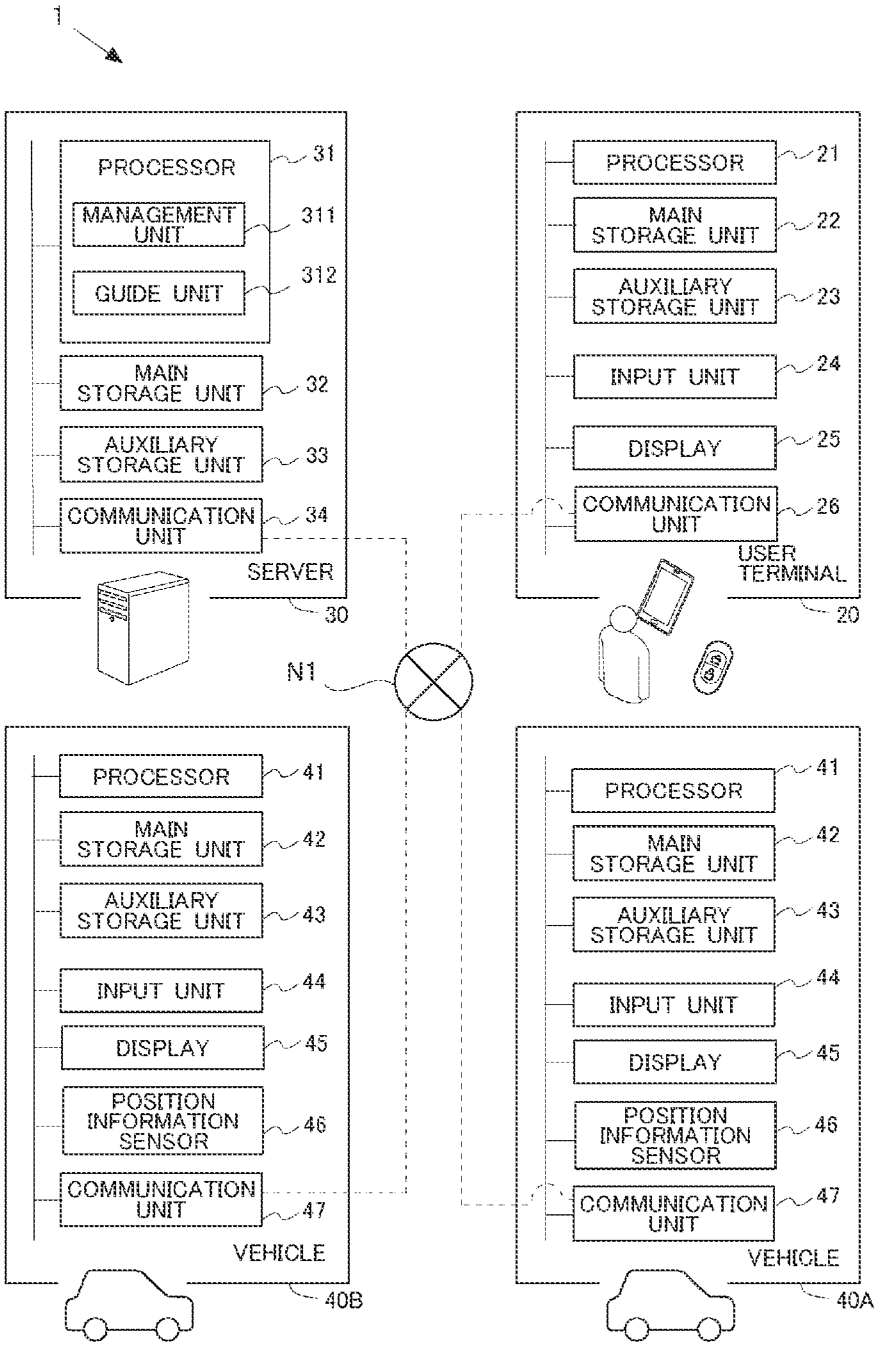
FIG. 1 is a diagram showing a system configuration.

The information processing apparatus according to one aspect of the present disclosure includes a controller. The controller acquires first information related to a request for a predetermined operation performed before a first vehicle moves, which is required for the first vehicle from outside the first vehicle parked in a parking lot; and transmits, in response to acquiring the first information, second information for causing a user of a second vehicle waiting for parking to recognize a position where the first vehicle is parked.

The information processing apparatus is, for example, a server device connected to a communication network. The server device may be a plurality of devices that operate in cooperation or may be a so-called cloud server. The first vehicle is a vehicle parked at a position where parking is planned, such as in a parking frame of a parking lot. The second vehicle is, for example, a vehicle waiting to be parked. The second vehicle may register in advance a parking lot that wishes to be parked with the information processing apparatus. The first information may be, for example, information about a request to unlock the doors of the first vehicle. In this case, the information processing apparatus receives information indicating the lock or unlocking state as first information from the on-board device provided in the vehicle. The first information may also be a request to operate remote air conditioning. In this case, the information processing apparatus receives, for example, the first information from a terminal owned by the user of the first vehicle, and further requests the in-vehicle device of the first vehicle to start the air conditioning. Further, the first information may be a request to operate a car finder that confirms the parking position of the first vehicle. In this case, the information processing apparatus may receive first information from a terminal owned by the user of the first vehicle, or may receive first information from an in-vehicle device provided in the vehicle. The second information may indicate the parking position of the first vehicle with position information on the map, or may be indicated by identification information for specifying the parking frame. Further, the second information may be transmitted to the in-vehicle device of the second vehicle or to a terminal owned by the user of the second vehicle, or may be transmitted to a predetermined computer for display on an electric bulletin board or large video device provided in a parking lot or the like.

If the first vehicle is acquired, it can be predicted that the parking position of the first vehicle will become vacant in the near future. Therefore, the controller outputs information that causes other users waiting to park to recognize the position of the parking frame. In particular, by performing the process based on the first information related to the request for the predetermined operation which is requested from the outside of the first vehicle to the first vehicle and is executed before the first vehicle moves, it is possible to detect the sign of the movement of the parked vehicle at an earlier stage and to notify the user waiting for parking of the sign.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

First Embodiment

FIG. 1 is a diagram showing a configuration of the system 1 according to the present embodiment. When the system 1 according to the present embodiment detects a sign of movement of a parked vehicle in a parking lot or the like, the system 1 notifies other users waiting for parking the position where the vehicle is parked.

In the example of FIG. 1, the system 1 includes a user terminal 20, a server 30, and a vehicle 40 (40A, 40B). The user terminal 20, the server 30, and the vehicle 40 are connected to each other communicatively by the network N1. The user terminal 20 is a terminal used by the user. The vehicle 40 is a vehicle on which the user rides. The vehicle 40 may be a vehicle driven manually by the user or may be a vehicle traveling autonomously. Note that there may be a plurality of user terminals 20 and vehicles 40.

The network N1 is, for example, a worldwide public communication network such as the Internet, and a WAN (Wide Area Network) or other communication network may be adopted. Further, the network N1 may include a telephone communication network such as a mobile phone or a wireless communication network such as Wi-Fi (registered trademark).

Figure 2:
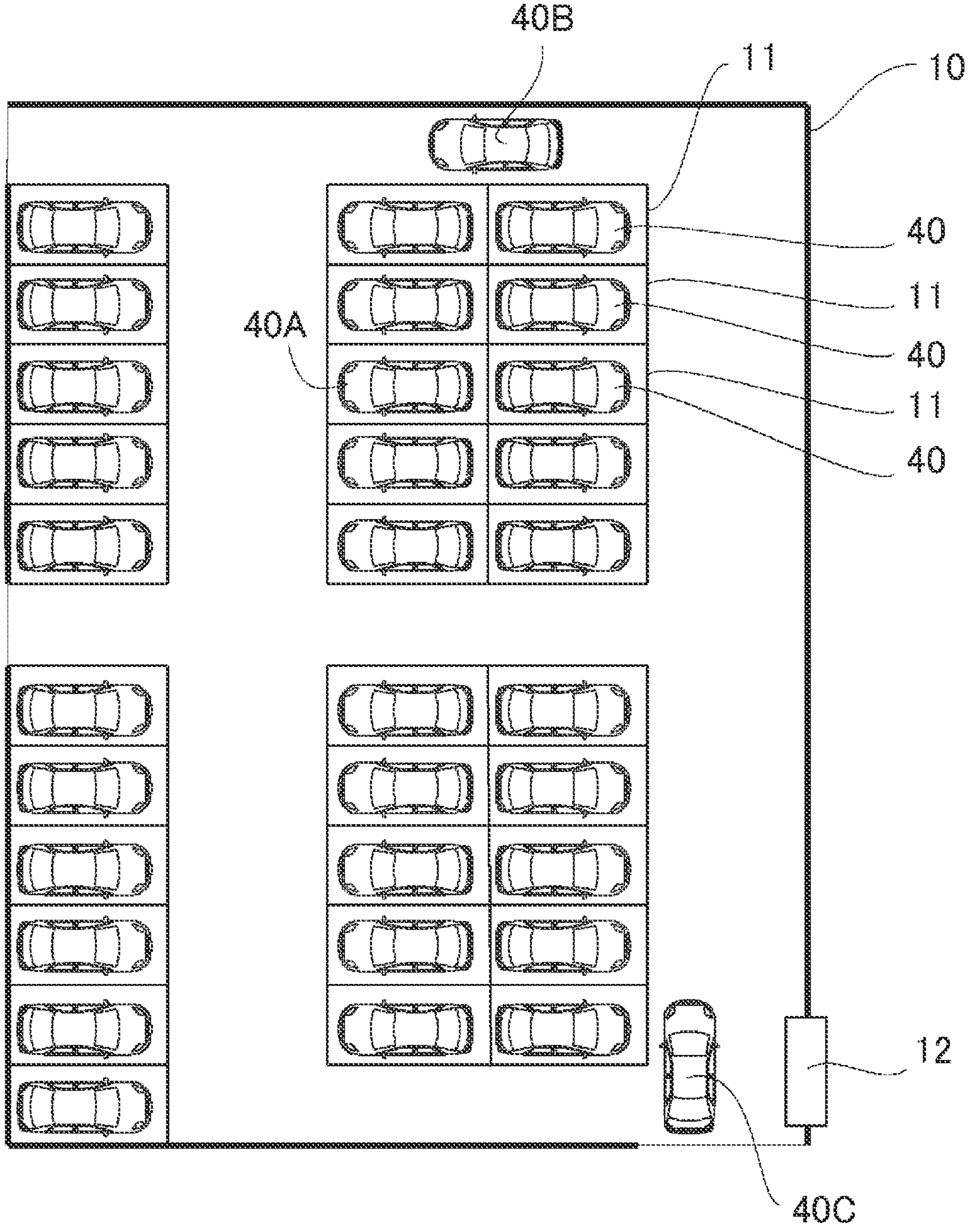
FIG. 2 is a diagram for explaining the scene where the embodiment is applied.

FIG. 2 is a diagram for explaining a scene in which the present embodiment is implemented. The parking lot 10 is provided with a plurality of parking frames 11 indicating a position to be parked. In FIG. 1, the vehicle 40 is parked in all parking frames 11. It is assumed that at least a part of the vehicle 40 can communicate with the server 30 shown in FIG. 1. Further, at least a part of the user of the vehicle 40 may have a user terminal 20 capable of communicating with the server 30. In the example of FIG. 2, the vehicle 40 includes a vehicle 40A (also referred to as a "first vehicle") that is already parked in the parking lot and is expected to move, a vehicle 40B (also referred to as a "second vehicle") that is waiting to be parked, and a vehicle 40C (also referred to as a "third vehicle"). The parking lot 10 may include a display unit 12 such as an electric bulletin board or a large video device. The display unit 12 is connected to a computer that can communicate via the network N1, for example, and can display predetermined information based on a request from the server 30.

The server 30 of FIG. 1 is a computer, and includes a processor 31, a main storage unit 32, an auxiliary storage unit 33, and a communication unit 34. They are connected to each other by bus.

The processor 31 includes a CPU (Central Processing Unit) or a DSP (Digital Signal Processor). The processor 31 controls the server 30 and performs various information processing calculations. Processor 31 is an example of a controller. FIG. 1 shows a functional block in the processor 31. That is, the processor 31 functions as a management unit 311 and a guide unit 312 by, for example, executing a program according to the present embodiment. However, any of each functional construct or a part thereof processing may be executed by a hardware circuit. The management unit 311 acquires information (also referred to as "first information") regarding a request for a predetermined operation performed before the vehicle 40A moves, which is requested from the outside of the vehicle 40A to the vehicle 40A, via the communication unit 34. In response to acquiring the information regarding the request, the guide unit 312 transmits information (also referred to as "second information") for causing the user of the vehicle 40B or the vehicle 40C waiting for parking to recognize the position where the vehicle 40A is parked via the communication unit 34.

The main storage unit 32 is RAM (Random Access Memory), ROM (Read Only Memory), and the like. The auxiliary storage unit 33 is an EPROM (Erasable Programmable ROM), a hard disk drive (HDD, Hard Disk Drive), a removable media, and the like. The auxiliary storage unit 33 stores an operating system (Operating System: OS), various programs, various tables, and the like. The processor 31 loads the program stored in the auxiliary storage unit 33 into the work area of the main storage unit 32 and executes it, and each component and the like are controlled through the execution of this program. Thereby, the server 30 realizes a function that matches a predetermined purpose. The main storage unit 32 and the auxiliary storage unit 33 are computer readable recording medium. The information stored in the auxiliary storage unit 33 may be stored in the main storage unit 32. Further, the information stored in the main storage unit 32 may be stored in the auxiliary storage unit 33.

The communication unit 34 is used for communicating with the user terminal 20 and the vehicle 40 via the network N1. The communication unit 34 is, for example, a LAN (Local Area Network) interface board and a wireless communication circuit for wireless communication. The LAN interface board and the wireless communication circuit are connected to the network N1.

The user terminal 20 of FIG. 1 is, for example, a small computer such as a smartphone, a mobile phone, a tablet terminal, a personal information terminal, a wearable computer (smart watch, etc.), and a personal computer (Personal Computer, PC). The user terminal 20 includes a processor 21, a main storage unit 22, an auxiliary storage unit 23, an input unit 24, a display 25, and a communication unit 26. They are connected to each other by buses. The processor 21 may, for example, execute a predetermined program to directly communicate with the vehicle 40 based on a communication standard such as Bluetooth (registered trademark), and may function as a digital key for locking and unlocking the door of the vehicle 40. Further, the processor 21 may be capable of remotely controlling the air conditioner provided in the vehicle 40 via the network N1 and the server 30, for example, by executing a predetermined program. Further, the processor 21 may directly communicate with the vehicle 40 by executing a predetermined program, for example, or communicate with the vehicle 40 via the network N1 to operate the car finder of the vehicle 40.

Since the main storage unit 22 and the auxiliary storage unit 23 are the same as the main storage unit 32 and the auxiliary storage unit 33 of the server 30, description thereof will be omitted. The input unit 24 is used for receiving input operations performed by a user, for example, a touch panel, a mouse, a keyboard, or a push button. The display 25 is used for presenting information to the user, for example, an LCD (Liquid Crystal Display) or an EL (Electroluminescence) panel. The input unit 24 and the display 25 may be configured as one touch panel display. The communication unit 26 is a communication unit for connecting the user terminal 20 to the network N1. The communication unit 26 is, for example, a circuit for communicating with other devices (e.g., server 30 and vehicle 40) via a mobile communication service (e.g., telephone communication networks such as 5G (5th Generation), 4G (4th Generation), 3G (3rd Generation)), Wi-Fi (registered trademark), Bluetooth (registered trademark), or other wireless It is a circuit for communicating with other devices (e.g., server 30 and vehicle 40) via network N1 using a communication network.

In addition to or the user terminal 20 as described above, the user may have a portable device for performing keyless entry or smart entry.

The vehicle 40 includes a processor 41, a main storage unit 42, an auxiliary storage unit 43, an input unit 44, a display 45, a position information sensor 46, and a communication unit 47. They are connected to each other by bus. Further, each of these components may be realized not by a single module, but by a combination of an in-vehicle device such as a car navigation system, an in-vehicle communication device, an ECU (Electronic Control Unit), or the like. Processor 41, main memory 42, auxiliary memory 43, input 44, display 45, and communication 47 are the same as processor 21, main memory 22, auxiliary memory 23, input 24, display 25, and communication 26 of user terminal 20, and thus are not explained.

Further, the position information sensor 46 outputs the position information (for example, latitude, longitude) of the vehicle 40 at a predetermined period. The position information sensor 46 is, for example, a GPS (Global Positioning System) receiving unit, a wireless communication unit, and the like. The information output by the position information sensor 46 is recorded, for example, in the auxiliary storage unit 43 or the like and transmitted to the server 30. The position information sensor 46 or the processor 41 may have a function of estimating a position by matching position information obtained from a signal of a positioning satellite with map information, or further using information output by a vehicle speed sensor or a gyro sensor mounted on the vehicle 40, a signal transmitted by a beacon provided in the parking lot 10 or the like, or the like.

Figure 3:
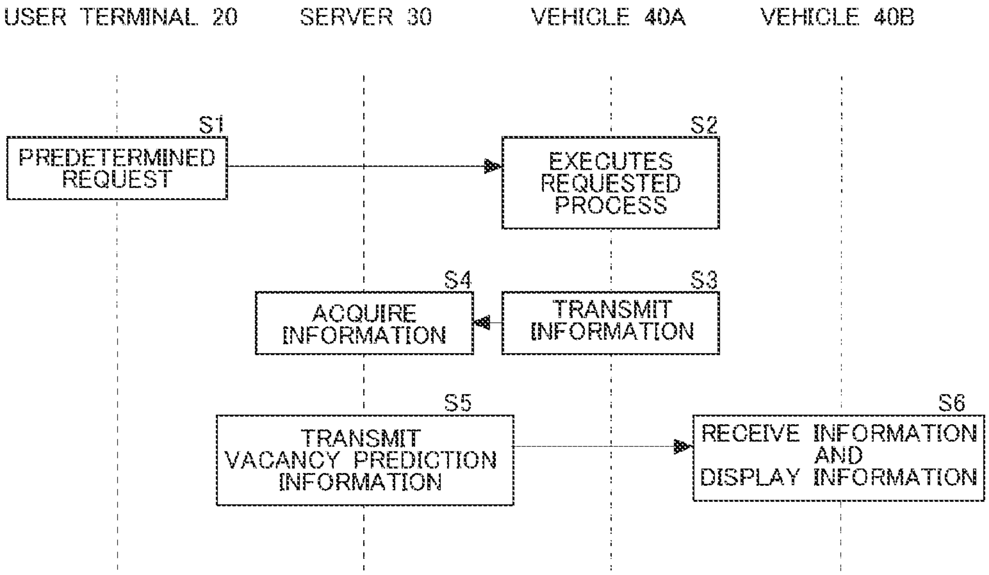
FIG. 3 is a schematic sequence diagram showing an example of a process executed by the system.

Next, a process executed by the system 1 will be described. FIG. 3 is a schematic sequence diagram showing an example of a process executed by the system 1. In FIG. 3, first, based on the user operation, the processor 21 of the user terminal 20 transmits a predetermined request to the vehicle 40A via the communication unit 26 (FIG. 3: S1). In this step, information requesting, for example, the opening of the door locks of vehicle 40A is transmitted. On the other hand, the processor 41 of the vehicle 40A receives a request via the communication unit 47 and executes the requested process (FIG. 3: S2). In this step, for example, the door of the vehicle 40A is unlocked.

Further, the processor 41 of the vehicle 40A notifies the server 30 of a change in the lock state of the door of the vehicle 40A via the communication unit 47 (FIG. 3: S3). In the present embodiment, the information transmitted in S3 corresponds to "first information". On the other hand, the processor 31 of the server 30 acquires a notification via the communication unit 34 and stores the lock state of the door of the vehicle 40A in the auxiliary storage unit 33 (FIG. 3: S4). FIG. 4 is a diagram illustrating an example of data stored in the auxiliary storage unit 33 of the server 30. Note that the data structure of the table shown in FIG. 4 is an example, and information may be stored separately in a plurality of tables by normalization as appropriate, or information may be stored together in one table by denormalization. In S4 of FIG. 3, information as shown in the lock management table 331 is registered or updated. The lock management table 331 includes attributes of "vehicle ID", "state" and "update date and time". The vehicle ID field stores identification information for uniquely identifying the vehicle 40. In the state field, information indicating the state of the door lock indicating locking or unlocking is stored. The update date and time field stores the date and time when the state was changed.

After S4 in FIG. 3, the processor 31 of the server 30 transmits second information to the vehicle 40B via the communication unit 34 (FIG. 3: S5). For example, the second information may include a command for displaying the parking position of the vehicle 40A on the display 45 of the vehicle terminal included in the vehicle 40B. The parking management table 332 of FIG. 4 is a table for storing the position of the vehicle. The parking management table 332 includes attributes of "vehicle ID" and "parking position". The vehicle ID field stores identification information for uniquely identifying the vehicle 40. The parking position field stores position information indicating the position where the accessory power supply or ignition power supply of the vehicle 40 is turned off. The position information may be information output by the position information sensor 46 or may be identification information for specifying the parking frame 11 (FIG. 2). The information stored in the parking management table 332 is transmitted from the vehicle 40 to the server 30 at any timing at S3 of FIG. 3 or earlier. Further, the vehicle 40B that is waiting for parking is stored in advance in the parking waiting table 333 in FIG. 4, for example. The parking waiting table 333 includes attributes of "vehicle ID" and "position information". The vehicle ID field stores identification information for uniquely identifying the vehicle 40. The position information field stores position information indicating the position of the vehicle 40. Position information is continuously updated, for example. The information stored in the parking waiting table 333 may be registered when the server 30 receives information indicating that the parking lot 10 is desired in advance from the vehicle 40 or from the user terminal 20 owned by the user of the vehicle 40. Further, when the server 30 continuously acquires the position information of the vehicle 40 and the server 30 detects that the vehicle 40 continues to move for a predetermined time or more in the parking lot 10, or when the server 30 detects that the vehicle 40 forms a waiting row of the parking lot 10, the server 30 may register the vehicle 40 on the parking waiting table 333. The parking waiting table 333 is created for each parking lot 10. Further, when the vehicle 40 whose record is registered in the parking waiting table 333 is subsequently parked (for example, when the accessory power supply or ignition power supply is turned off), or when it moves a predetermined distance or more from the parking lot 10 thereafter, the record of the vehicle 40 may be deleted from the parking waiting table 333. In S5, the parking position of the vehicle 40A, which is the communication partner of S4, is read from the parking management table 332 and transmitted to the vehicle 40 registered in the parking waiting table 333. If multiple vehicles 40 (e.g., vehicle 40B and vehicle 40C) are registered in the parking waiting table 333, information may be sent to multiple vehicles 40 in S5, or the vehicle 40 to which information is sent may be determined based on predetermined criteria.

On the other hand, the processor 41 of the vehicle 40 waiting for parking receives information via the communication unit 47, and causes the display 45 to display information for causing the user of the vehicle 40 waiting for parking to recognize a parking position where a vacancy may occur (FIG. 3: S6). In this step, a car navigation system, for example, displays a layout diagram of the parking lot, an own vehicle, and the parking positions where vacancies may occur. The layout diagram of the parking lot may be stored in the auxiliary storage unit 43 of the vehicle 40 in advance, or may be received from the server 30 in S6.

As explained above, this embodiment can identify parking position that is expected to become available in the near future based on door unlocking requested for the vehicle 40A from outside of the vehicle 40A, and inform the user of the second vehicle waiting to park of those position s. Thereby, signs of movement of parked vehicles can be detected at an earlier stage and users waiting to be parked can be notified.

In S1 of FIG. 3, when the operation of the car finder of the vehicle 40A is requested instead of the unlocking of the door lock, it may be predicted that the parking position of the vehicle 40A will be vacant in the near future. In S1 of FIG. 3, the later process may be performed when a request is made to vehicle 40A from a portable device for keyless entry or smart entry to unlock the door locks or activate the car finder, rather than from user terminal 20. Further, in S6, the vehicle 40 waiting for parking may output information by voice. Further, in S5 and S6, information may be notified and output to the user terminal 20 possessed by the user of the vehicle 40 waiting to be parked. If information is obtained from multiple vehicles 40A regarding requests for predetermined actions to be performed before moving, the parking positions may be predicted to be available in the order in which such information is obtained, or the order in which parking positions are available may be predicted based on some information.

Second Embodiment

In the second embodiment, first information is transmitted from the user terminal 20 to the server 30. In addition, the display unit 12 (FIG. 2) provided in the parking lot, not in the vehicle 40B, is caused to display information for causing the user of the vehicles 40 waiting for parking to recognize a parking position where there is a possibility that vacancy will occur. In this embodiment, the configuration of System 1 is the same as that shown in FIG. 1, so the explanation is omitted.

Figure 5:
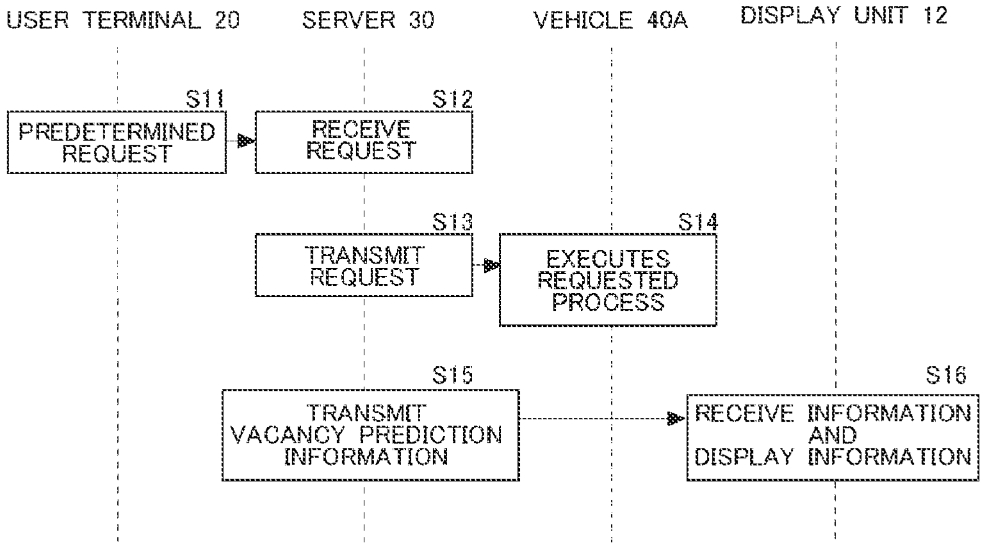
FIG. 5 is a schematic sequence diagram showing an example of a process executed by the system.

FIG. 5 is a schematic sequence diagram showing an example of a process executed by the system 1. In FIG. 5, first, based on the user operation, the processor 21 of the user terminal 20 transmits a predetermined request to the server 30 via the communication unit 26 (FIG. 5: S11). In this step, information requesting to remotely start the air conditioner of the vehicle 40A, for example, is transmitted. In the present embodiment, the request of S11 corresponds to "first information". When the processor 31 of the server 30 receives a request via the communication unit 34 (S12), it transmits a request to the vehicle 40A (S13), and transmits second information to the display unit 12 via the communication unit 34 (FIG. 5: S15).

On the other hand, the processor 41 of the vehicle 40A receives a request via the communication unit 47 and executes the requested process (FIG. 5: S14). In this step, for example, the air conditioner of the vehicle 40A is started operation. The display unit 12 receives information via the network N1 and displays information to make the user of the vehicle 40 waiting for parking aware of the parking position where a vacancy may occur (FIG. 5: S16). In this step, for example, information indicating a parking position where a vacancy may occur is displayed on an electronic bulletin board or a large video device. Further, in addition to information indicating the state of full or vacancy on the electronic bulletin board, information on prediction may be displayed.

According to this embodiment, the system can identify parking positions that are expected to become available in the near future based on air conditioning operation requests from outside of vehicle 40A to vehicle 40A, and inform the user of a second vehicle waiting to park of the position. The present embodiment also enables the early detection of signs of movement of parked vehicles and notifies the user waiting for parking.

Note that S1 to S4 of the first embodiment (FIG. 3) may be performed in combination with S15 and S16 of the second embodiment (FIG. 5). Further, S11 to S14 of the second embodiment may be performed in combination with S5 and S6 of the first embodiment. Further, in addition to the first embodiment, S15 and S16 of the second embodiment may be implemented.

Third Embodiment

In the third embodiment, when a request for a predetermined operation is made to the vehicle 40A from outside the vehicle 40A, the server 30 determines whether there is a high possibility of moving. For example, in S5 of the first embodiment (FIG. 3) or S15 of the second embodiment (FIG. 5), the server 30 performs the process shown in FIG. 6. Note that, in the present embodiment as well, the configuration of the system 1 is the same as that shown in FIG. 1, so description thereof will be omitted.

Figure 6:
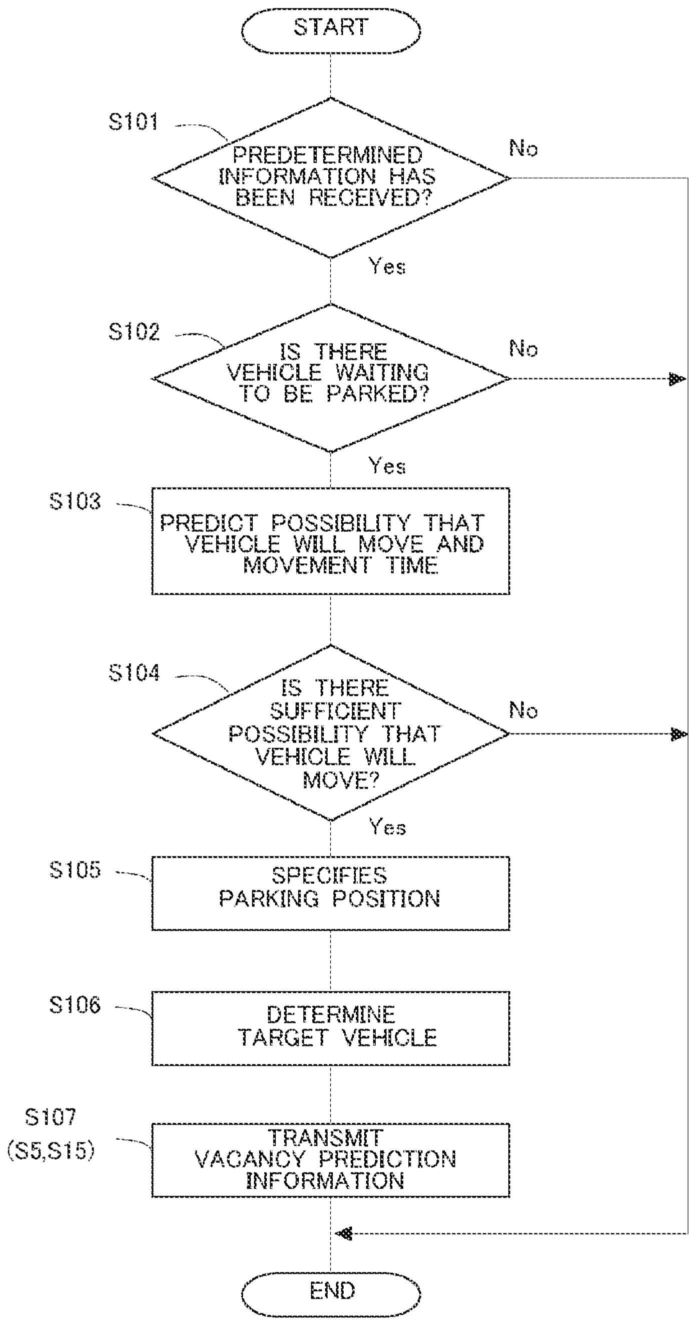
FIG. 6 is a process flow diagram showing an example of a process executed by the server.

FIG. 6 is a process flow diagram showing an example of a process executed by the server 30. First, the processor 31 of the server 30 determines whether a predetermined information has been received (FIG. 6: S101). In this step, the processor 31 of the server 30 determines whether information (first information) regarding a request for a predetermined operation to be executed before the vehicle 40 moves, which is requested from the outside of the vehicle 40 parked in the parking lot to the vehicle 40, has been acquired. For example, information on a request to unlock the door of the vehicle 40A, information about a request to activate remote air conditioning of the vehicle 40A, or a car finder confirming the parking position of the vehicle 40A If the server 30 acquires information about the request, the processor 31 determines that the predetermined information has been received.

When it is determined that the first information has been received in S101 (S101: Yes), the processor 31 determines whether there is a vehicle 40 waiting to be parked (FIG. 6: S102). In this step, it is determined whether a record of the vehicle 40 waiting to be parked is registered in the parking waiting table 333 stored in the auxiliary storage unit 33 of the server 30.

If it is determined that there is a vehicle 40 waiting to be parked (S102: Yes), the processor 31 predicts the possibility that the vehicle 40A will move (FIG. 6: S103). The processor 31 may further predict the movement time of the vehicle 40A.

For example, if the time from when the door of the vehicle 40A is locked to when it receives a request to unlock is less than or equal to a predetermined threshold, it is determined that the possibility of the vehicle 40A moving is low. For example, when the user of the vehicle 40A returns to pick up the forgotten item, it can be determined that the possibility of moving the vehicle 40A is low. In some embodiments, since the general parking time varies depending on the surrounding environment of the parking lot 10, such as what kind of facility the parking lot 10 is attached to, a threshold value is set appropriately for each parking lot 10.

Further, for example, the tendency may be learned based on the action history of each vehicle 40 or the action history of each user who drives the vehicle 40. In this case, it can be determined that the possibility of movement is higher as the date and time or the like when the request for the predetermined operation to be executed before the vehicle 40 moves is closer to the tendency of the movement timing learned in advance. The history table 334 of FIG. 4 is an example of an action history. The history table 334 includes attributes of "vehicle ID", "parking start", "parking end" and "request date and time". The vehicle ID field stores identification information for uniquely identifying the vehicle 40. The parking start field stores the date and time when parking started. The parking end field stores the date and time when the movement started after parking. In the field of the request date and time, the date and time when a request for a predetermined operation to be executed before the vehicle 40 moves is received is stored. Based on such behavior history, machine learning is performed on the tendency of each vehicle 40 or each user, for example, for each day of the week or each time of day, and a learned model 335 (FIG. 4) is stored. The learned model 335 includes parameters resulting from performing machine learning using any machine learning model. In particular, the possibility of moving can be accurately predicted for the vehicle 40 that regularly repeats movement for pick-up and drop-off and the like.

Further, the movement time of the vehicle 40A may be predicted based on the time from receiving a request for a predetermined operation executed before the vehicle 40 moves to the time until the vehicle 40 moves. For example, a prediction model may be created using an arbitrary machine learning model, or a representative value such as an average, mode, median, etc. may be obtained based on the action history for each vehicle 40 or for each user, and the prediction time according to the representative value may be calculated. For example, it will be possible to predict how far in advance of vehicle 40 movement the remote air conditioning will be activated, based on trends per vehicle 40 or per user.

Thereafter, the processor 31 determines whether there is a sufficient possibility that the vehicle 40A will move (FIG. 6: S104). In this step, for example, when the value indicating the possibility of moving exceeds a predetermined threshold, the processor 31 can determine that there is a sufficient possibility that the vehicle 40A will move. The threshold value to be used in this step shall be set in advance.

If it is determined that there is sufficient movement in S104 (S104: Yes), the processor 31 specifies the parking position of the vehicle 40A (FIG. 6: S105). In this step, for example, the parking position of the vehicle 40A is read from the parking management table 332 of FIG. 4.

Further, the processor 31 determines the target vehicle 40 to transmit the second information (FIG. 6: S106). The target vehicle 40 is read, for example, from the parking waiting table 333 of FIG. 4. For example, all vehicles 40 registered in the parking waiting table 333 may be extracted. In this case, when the plurality of vehicles 40 are waiting for parking, the vehicle can be parked on a first-come, first-served basis. Further, when there are a plurality of vehicles 40 waiting to be parked, the target vehicle 40 for transmitting second information may be narrowed down based on the distance from the position where the vehicle 40A is parked to the vehicle 40 waiting to be parked. For example, processor 31 may send the second information to the vehicles 40 that are waiting to park and are located within a predetermined range from vehicle 40A. In the example in FIG. 2, for example, if processor 30 determines that vehicle 40A may move, processor 30 sends the second information to vehicle 40B, which is located within a predetermined range from vehicle 40A, and does not send the second information to vehicle 40C, which is not located within a predetermined range from vehicle 40A, thereby enabling efficient guidance based on vacancy prediction. The date and time when the parking wait started may be stored in the parking waiting table 333, and the second information may be sent preferentially to the vehicles 40 that have been waiting for a longer period of time, to ensure fairness.

Then, the processor 31 transmits the second information to the vehicle 40 waiting to be parked (FIG. 6: S107). This step is the same as S5 in FIGS. 3 and S15 in FIG. 5, but if the time of movement of vehicle 40A is predicted in S103, the timing of sending the second information may be controlled based on the predicted time, or the second information may include information indicating the predicted time. Thereafter, the processor 31 ends the process of FIG. 6. Further, when it is determined that predetermined information has not been received in S101 (S101: No), when it is determined that there is no vehicle 40 waiting to be parked in S102 (S102: No), and when it is determined that the movement possibility is insufficient in S104 (S104: No), the process of FIG. 6 is terminated.

According to the prediction of the movement possibility of the S103, it is possible to improve the accuracy of the second information related to the vacancy prediction. Further, when narrowing down the transmission destination of the second information, it is possible to smooth the movement of a plurality of vehicles 40 in the parking lot or to alleviate the sense of unfairness of the user waiting for parking according to the criteria for narrowing down.

Of the processes shown in the third embodiment, only a part of it (prediction of movement, narrowing down the notification destination of the second information, etc.) may be executed.

Other Embodiments

The above-described embodiment and modification are merely examples, but the present disclosure can be implemented with appropriate modifications without departing from the spirit thereof.

The processing and/or elements (devices, units, parts, etc.) described in the present disclosure can be freely combined and implemented as long as no technical contradiction occurs. The sequence diagram shown in FIGS. 3 and 5 and the process flow diagram shown in FIG. 6 may change the order of processing as long as the result does not change, or the process may be executed in parallel.

In addition, the processing described as being performed by a single device or unit may be shared and performed by a plurality of devices or units. Alternatively, the processing described as being performed by different devices or units may be performed by one device or unit. In a computer system, a hardware configuration (server configuration) for realizing each function thereof can be changed in a flexible manner.

The present disclosure can also be realized by supplying to a computer a computer program in which the functions described in the above-described embodiment or modification are implemented, and reading out and executing the program by one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, or any type of medium suitable for storing electronic commands or instructions.

What is claimed is:

1. An information processing apparatus comprising a controller configured to:

acquire first information related to a request for a predetermined operation performed before a first vehicle moves, which is required for the first vehicle from outside the first vehicle parked in a parking lot; and transmit, in response to acquiring the first information, second information for causing a user of a second vehicle waiting for parking to recognize a position where the first vehicle is parked, wherein the first information is a request to unlock a door of the first vehicle, and wherein the controller transmits the second information when a time from receiving information that the door of the first vehicle is locked to acquiring the first information is greater than or equal to a predetermined time, and do not transmit the second information when the time from receiving information that the door of the first vehicle is locked to acquiring the first information is less than the predetermined time.

2. The information processing apparatus according to claim 1, wherein the controller acquires information on a request to unlock a door of the first vehicle, a request to operate an air conditioning of the first vehicle, or a request to operate a car finder confirming a parking position of the first vehicle as the first information.

3. The information processing apparatus according to claim 1, wherein the controller includes, in the second information, a command for displaying a parking position of the first vehicle on a display of an in-vehicle terminal of the second vehicle located in the parking lot.

4. The information processing apparatus according to claim 1, wherein when the second vehicle waiting for parking exists within a predetermined distance from the first vehicle, the controller does not transmit the second information to a third vehicle waiting for parking and not located within the predetermined distance from the first vehicle.

* * * * *